Oct. 12, 1943.    E. WAINER    2,331,444
PHOTOCONDUCTIVE MATERIAL AND METHOD
Filed Sept. 16, 1941
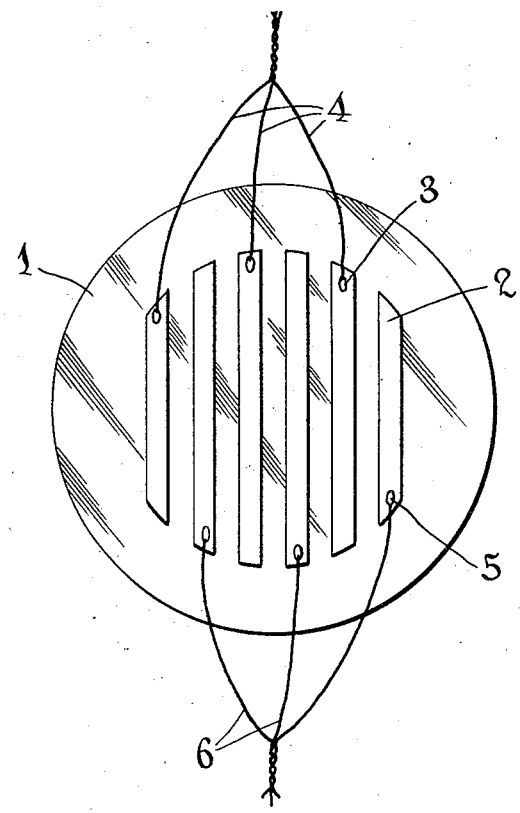
INVENTOR
*Eugene Wainer,*
BY
*Beau, Brooks, Buckley + Beau.*
ATTORNEYS Patented Oct. 12, 1943

2,331,444

UNITED STATES PATENT OFFICE 2,331,444

PHOTOCONDUCTIVE MATERIAL AND METHOD

Eugene Wainer, Niagara Falls, N. Y., assignor to The Titanium Alloy Manufacturing Company, New York, N. Y., a corporation of Maine Application September 16, 1941, Serial No. 411,045

11 Claims. (Cl. 201—63)

This invention relates to photosensitive materials. More particularly, it relates to "photoconductive" materials, that is, materials which exhibit a greater electrical conductivity in the light than in the dark.

In the past, it has been known that many materials, particularly crystalline selenium, exhibit the property of photoconductivity and find utility in photocell applications. By photoconductivity is meant the property by which a body becomes a better conductor of electricity when illuminated than in the dark. Usually selenium is prepared in thin films whose conductivity changes under action of light, the variation in volume resistivity being the property of which advantage is taken. Selenium, however, possesses several disadvantages. It is attacked by water vapor and oxygen of the air, so that for best results it is necessary that it be mounted in an evacuated glass envelope. It has a high inertia of response, shows fatigue, and its conductivity in the dark is relatively high. It is sensitive to heat, and its properties may be highly affected by a sudden change in temperature or mechanical shock. It is subject to allotropic modification, only one of which is light sensitive, and such allotropic change takes place relatively close to room temperature. Commercial selenium cells have a dark-light resistance ratio from 3 to 1 to as high as 6 to 1, this factor being the determining point for commercial application.

In accordance with this invention, it has now been found that the electrical conductivity of titanium dioxide, particularly when heated under certain preferred conditions to form a dense non-porous ceramic mass, is sensitive to the action of light. This sensitivity can be made most effective by certain preferred additions, as hereinafter pointed out, and certain preferred treatments. In particular, it has been found that under certain conditions titanium dioxide is rendered insensitive to the action of light. The present invention resides not only in utilizing the photosensitive character of titanium dioxide to transform variations in light energy into variations in electrical energy, but also in enhancing its characteristics in this respect and avoiding those conditions which tend to obscure or destroy this effect.

In accordance with this invention, it has been found that the purity of the titanium dioxide, and the presence or absence of certain impurities or additions, is of the utmost importance in securing the best results. Thus, the commercially pure titanium dioxide known as heavy grade titanium dioxide, obtained by calcination of pigment grade titanium dioxide at around 1350° C., has a surface resistance under the conditions hereinafter defined of about 6 times in darkness that which it has in light of a certain illumination, and returns immediately to its darkness resistance when the illumination is removed. Titanium dioxide of this character usually contains traces of iron, manganese, chromium and vanadium as impurities. As shown hereinafter, these elements when present in the form of their higher oxides tend to obscure or destroy the photoconductivity of the titanium dioxide. This effect can be overcome, on the other hand, by insuring that these elements exist in the form of their lower valent oxides, or by the presence or addition of certain other materials as hereinafter pointed out, or by observing certain firing conditions.

Combinations of titanium dioxide with oxides or titanates of barium, magnesium, zinc, or cadmium in general appear to produce the photoconductive effect to a greater extent than pure titanium dioxide. Combinations of titanium dioxide with oxides or titanates of calcium, strontium, beryllium, divalent lead, aluminum, cerium, tin or nickel in general appear to also produce good results, although not as good as in the case of barium, magnesium, zinc and cadmium. Combinations of titanium dioxide with oxides or titanates of copper, zirconium, silicon, tantalum or cobalt produce definite but barely measurable photoconductive effects. Combinations of titanium dioxide with oxides or titanates of iron, manganese, vanadium and chromium are ineffective. Thus it will be observed that combinations of titanium dioxide with oxides or titanates of divalent elements generally produce the best results. In some cases, variations between different divalent elements (such as the fact that barium appears to be better than calcium) may be more apparent than real, and due perhaps to faulty preparation and treatment of the particular compositions involved.

In addition to the above factors, photoconductivity is much more pronounced in bodies that are definitely overfired than in bodies that are correctly matured. In ceramic practice, overfiring is ordinarily accompanied by crystallization or pronounced crystal growth, and in the present case also by partial reduction of some constituents present in commercial titanium dioxide. For example, in a normally fired body, iron, manganese, chromium and vanadium tend to exist in their highest valence state, which is red or red brown colored in each case. When strongly over-heated the most stable forms of these metals are the lower valent oxides or compounds, which are green in the case of iron, manganese and chromium, and green to blue for vanadium. At overfiring temperatures the stable form of titanium oxide is $Ti_2O_3$, which is blue and which would further tend to keep Fe, Mn, Cr and V in the reduced state, besides contributing to the absorption of red light. Thus, bodies containing any substantial amount of Fe, Mn, Cr or V are insensitive to light when subjected to normal firing conditions; but bodies containing traces of Mn, Cr or V, and to a lesser extent Fe, are more powerfully light sensitive than pure $TiO_2$ when overfired. This is still more true if in addition an excess of divalent oxides are present, and also if just before the firing is completed the body is given a reducing atmosphere flash.

Finally, exposure of the photoconductive pieces to light is invariably accompanied by a visible change in color towards a blue, blue brown, blue black or lavender.

It appears, therefore, that the photoconductive effect, that is, change of resistance under change of light intensity, is associated with crystalline $TiO_2$ and $TiO_2$ in a composition which does not contain substantial proportions of red or brown coloring agents. For example, Ni and Co in fired combinations with $TiO_2$ yield dark colored bodies of blue or blue green color, yet both show light sensitivity. Since bodies which reflect red light and absorb blue, green and yellow light appear red to the human eye, and bodies which absorb red light and reflect blue, green, or yellow light appear blue, green or yellow to the human eye, it would appear that the longer wave lengths of the visible spectrum must be absorbed to secure the photoconductive effect. Thus, bodies having a faint blue or greenish tinge, or less preferably a very pure yellow, exhibit the photoconductive effect. On the other hand, bodies which are red in tinge or color, such as most natural rutiles (which fire to a red brown color irrespective of flux additions), exhibit little if any photoconductivity. Likewise, since the peak of intensity of natural sunlight or ordinary artificial light is towards the red, pure white bodies should not show any photoconductivity if the above theory is correct. Such is the case with chemically pure titanium dioxide of 100.000% purity, and with pure magnesium titanate ($MgTiO_3$).

When titanium dioxide containing small amounts of iron, manganese, chromium or vanadium is fired with divalent or monovalent oxides at elevated temperatures, stable combinations are formed in which the Fe, Mn, Cr or V tends to be present in a lower valent stage, this being much more difficult to accomplish with iron than with the other elements. This may explain the action of these oxides in helping to produce the photoconductive effect.

Thus, to summarize, a titanium oxide body can be made photoconductive by having present or adding to the composition minute quantities of material that will enable it to preferentially absorb red light. This can be accomplished by (1) adding small amounts of blue or blue green producing oxides or titanates such as cobalt, nickel, copper, cobalt plus aluminum, cobalt plus zinc, and others, or iron, manganese, chromium or vanadium in the reduced state, and handling in such a way as to insure that the lower valent or blue to blue-green colors are apparent; (2) adding oxides of divalent elements such as Ca, Sr, Ba, Pb, Mg, Zn, Cd or combinations thereof to stabilize the blue or blue green form of the multivalent oxides; (3) overfiring to insure the presence of the lower valent blue or green oxides stable at the higher temperatures; (4) flashing in reducing atmosphere while overfiring; or (5) suitable combinations of 1 to 4 inclusive. Thus, a fired body consisting chiefly of crystalline $TiO_2$ having a very faint blue or blue-green color will be highly photosensitive and can be made so by the above suggestions.

In the application of the present invention, the titanium dioxide bodies are physically and chemically stable under practically all atmospheric conditions. When properly compounded in accordance with the above principles, response appears to be practically instantaneous and shows no fatigue either for rapid return or after extended illumination. They appear to be sensitive to minute changes in light sensitivity. Their peak of response is some place in the red. They can be subjected to high temperatures, and electrodes can be fired onto the surfaces of the bodies. They can be ceramically formed into any conceivable or suitable size, shape or form, and fired to physical rigidity and strength. Finally and most important, bodies having a dark-light ratio (ratio of electrical resistance in darkness to resistance in strong light) of higher than 15 to 1 can be prepared.

In arriving at the above conclusions, a large number of compositions were tested, and the results of these tests are shown in the tables which follow. In these tests, the added materials were incorporated as titanates, partly for the reason that better dimension control of the fired shapes can thus be secured. However, they may also be added as oxides, carbonates, etc. In view of the number of such compositions, a relatively quick test procedure, which was adapted to at least semi-quantitative evaluation, was developed. In this procedure circular test pieces about 3½ to 4 inches in diameter and $\frac{1}{8}$ inch thick were used. These pieces had previously been used for other tests, and in such other tests the pieces had been provided with a copper plating. Before using in the present tests, it was necessary to remove this plating by grinding on an emery wheel, which tended to leave streaks of dirt and copper on the surface. Although this detracted from the accuracy of the measurements, they are believed sufficiently accurate for comparative purposes.

The single figure of the drawing illustrates a piece of my photoconductive material.

One of these pieces is indicated generally at 1 in the drawing. On one surface of this piece a lattice of copper was sprayed in six parallel strips 2 about $\frac{1}{8}$ inch wide and about ¼ inch apart. Alternate strips were connected in parallel by means of solder connections 3 to lead-in wires 4. The opposite alternate strips were connected at the opposite ends in similar fashion by means of solder connections 5 and lead-in wires 6. The entire test piece was then inserted in the measuring arm of a Wheatstone bridge by suitable connections through lead-in wires 4 and 6 respectively, and the surface resistance measured before and during illumination with a fixed light source. Thus the total exposed area between conductors was in the neighborhood of 15 square centimeters.

The light source used consisted of a 200 watt Mazda lamp (clear) focussed on the specimen by means of a 6 inch diameter round bottom flask filled with 1% copper sulfate solution. The light source was kept about 10 inches from the specimen and the flask positioned to yield a 3 inch diameter circle of illumination. The lamp was activated with 110 volt D. C. current. The resistance of the bodies was first taken in shaded daylight such as ordinarily obtains in a far corner of a room the opposite side of which is illuminated by north light. The value recorded is that developed after a one minute charging period. The body was not conditioned in any manner. The light source was then turned on and a shield separating the light source from the body removed. The piece was illuminated for 3 to 4 seconds and the resistance corresponding to the new position of the measuring needle recorded. The light source was then shut off and the speed and extent of the return of the resistance to its original value recorded. Only those bodies were recorded as being light sensitive in which the fluctuation appeared to be instantaneous. Some of the bodies exhibit a very gradual drift towards lower resistances extending over a period of many minutes, while others show a sharp and rapid initial change followed by a very gradual drift of the resistance to lower values. It was satisfactorily established that this gradual long time drift is almost completely due to a change in resistance with temperature. Furthermore, in the case of those bodies in which the resistance does not immediately return to zero after cessation of illumination, but returns most of the way immediately, with a small portion remaining after an appreciable lapse of time, it appears that this discontinuous effect is due to temperature changes. For many reasons bodies markedly affected by temperature fluctuations may be considered inferior. Some of this fluctuation may be due to absorbed moisture and would be eliminated were the tests made on a baked out body in a vacuum or dry gas. Some of this temperature fluctuation may also be due to the metal streaks and dirt left by the grinding wheel in removing the original copper plate.

The reason that copper sulfate solution was employed was that, when pure water was used, the temperature of the surface of the body rose 1 to 1.5 degrees centigrade in the first two minutes, the rate of temperature rise sharply decreasing thereafter. When the water in the lens flask was replaced with 1% $CuSO_4$ solution the temperature rise on the body surface was cut to about 0.10 to 0.15° C. for the first two minutes, very little temperature increase taking place thereafter. At the same time the light intensity was highly reduced. In view of the fact that the resistance of many of these bodies drops with temperature increase, a relatively cold light source was necessary to distinguish between light and heat effects. The use of a blue transmitting light source would at first sight appear to be objectionable in view of the conclusions as to red sensitivity discussed above. However, tests reveal that a substantial amount of red light is transmitted by such a copper sulfate solution. To check this point some of the measurements were repeated with the bare tungsten light. No qualitative change was observed. Bodies insensitive to the copper sulfate filtered light were insensitive to the yellow tungsten light. The only difference was in extent of change of resistance, the bare light being generally a considerably more powerful stimulus than the filtered blue light and yielding higher dark-light resistance ratios.

In the following tests, the bodies were not prepared with a view towards securing the best possible results, but merely with a view towards securing a comparison between the various types of compositions. Thus, better results would undoubtedly be secured by overfiring the bodies, with or without flashing in a reducing atmosphere while overfiring.

The basic material in each case (except as noted) is heavy grade titanium dioxide of the following analysis:

| | Heavy Grade $TiO_2$ |
|---|---|
| $TiO_2$ | 97.8 |
| $SiO_2$ | 1.56 |
| $Fe_2O_3$ | 0.038 |
| $Al_2O_3$ | 0.40 |
| CaO | 0.03 |
| MgO | 0.04 |
| $MnO_2$ | 0.004 |
| $P_2O_5$ | 0.06 |
| CuO | 0.001 |
| $B_2O_3$ | 0.001 |
| $V_2O_5$ | 0.001 |

This is prepared by heating pigment grade $TiO_2$ to a temperature of 1350° C. and maintaining there for several hours. The resulting material shows well-defined crystals of an average particle size of about 2 microns. Each body is prepared by mixing heavy grade $TiO_2$ with a metallic titanate, the quantities being noted in the following tables. This mixture is ball milled with water, dried and disintegrated. To this mixture 10% by weight of 5% gelatin solution is added and thoroughly incorporated and the batch passed through a 20 mesh screen. 125 grams of the batch is placed in the cavity of a steel mold 4 inches in diameter and the specimen formed under a pressure of 1200 pounds per square inch. The body is then fired by bringing up gradually to a temperature of 2300° F. and maintaining there for about 6 hours. The body is then gradually cooled and is ready for measurements.

In the following Table I, the composition is 90 parts of heavy grade titanium dioxide, plus 10 parts of the titanate listed in the column headed "Composition." In Table II, the composition is 95 parts of heavy grade titanium, plus 5 parts of a mixture of the titanates listed. In both Tables I and II, where two titanates are listed for a given composition, the figures before each titanate represent the number of parts of that titanate present in the composition. In Table III, the composition is as listed, the $TiO_2$ being heavy grade titanium dioxide, and the rutile being of the following analysis:

| | Rutile |
|---|---|
| $TiO_2$ | 94.3 |
| $SiO_2$ | 3.78 |
| $ZrSiO_4$ | 1.06 |
| $Fe_2O_3$ | 0.175 |
| $Al_2O_3$ | 0.40 |
| CaO | 0.03 |
| MgO | 0.01 |
| $MnO_2$ | 0.001 |
| $P_2O_5$ | 0.03 |
| $Cr_2O_3$ | 0.001 |
| CuO | 0.001 |
| $B_2O_3$ | 0.001 |
| $V_2O_5$ | 0.20 |

Under the heading "Surface Resistance," the first figure given is the electrical resistance in subdued light as discussed above (dark resistance), and the second figure the electrical resistance of the illuminated body after 3 to 4 seconds of illumination (light resistance). Both figures are given in thousands of megohms, except in Examples 5 and 10, where the figure is given in megohms. In the next column, headed "P. C. Ratio" (photoconductivity ratio) is given the ratio of dark resistance to light resistance, the latter being given as unity. In the last column, headed "Return" is given a rough indication of whether or not the resistance of the body returns immediately to its original or dark resistance value after the illumination is shut off. If it does not return immediately ("No"), it will return slowly to its original value.

Table I. 90 Parts $TiO_2$ Plus

| Example No. | Composition | Surface resistance | | P. C. ratio | Return |
|---|---|---|---|---|---|
| 1 | $CaTiO_3$ | 80 | 38 | 2.11 | Yes. |
| 2 | $BaTiO_3$ | 400 | 40 | 10.0 | Yes. |
| 3 | $MgTiO_3$ | 500 | 65 | 7.69 | No. |
| 4 | $SrTiO_3$ | 44 | 16 | 2.75 | No. |
| 5 | $CuTiO_3$ | 3.45 | 3.42 | 1.01 | Yes. |
| 6 | $BeTiO_3$ | .62 | .61 | 1.02 | No. |
| 7 | $ZnTiO_3$ | 200 | 26 | 7.69 | Yes. |
| 8 | $CdTiO_3$ | 600 | 65 | 9.23 | Yes. |
| 9 | $Al_2TiO_5$ | 70 | 18 | 3.89 | No. |
| 10 | $Bi_2TiO_5$ | 49 | 46 | 1.07 | No. |
| 11 | $CeTi_2O_4$ | 200 | 65 | 3.08 | Yes. |
| 12 | $CeTh_2O_4$ | 10 | 4.1 | 2.44 | No. |
| 13 | $2PbTiO_3, 8BaTiO_3$ | 900 | 65 | 13.85 | Yes. |
| 14 | $5PbTiO_3, 5BaTiO_3$ | 32 | 8.5 | 3.76 | No. |
| 15 | $8PbTiO_3, 2BaTiO_3$ | 800 | 50 | 16.0 | No. |
| 16 | $2PbTiO_3, 8SrTiO_3$ | 19 | 6.9 | 2.75 | No. |
| 17 | $5PbTiO_3, 5SrTiO_3$ | 500 | 40 | 12.5 | No. |
| 18 | $8PbTiO_3, 2SrTiO_3$ | 90 | 25 | 3.6 | No. |
| 19 | $ZrTiO_4$ | 3 | 2.55 | 1.18 | No. |
| 20 | $SiTiO_4$ | 50 | 38 | 1.32 | No. |
| 21 | $Ta_2TiO_7$ | 30 | 29 | 1.03 | No. |
| 22 | $CoTiO_4$ | 14 | 13.9 | 1.01 | Yes. |
| 23 | $SnTiO_4$ | 200 | 54 | 3.70 | No. |
| 24 | $NiTiO_3$ | 400 | 80 | 5.0 | No. |

Table II. 95 Parts $TiO_2$ Plus

| Example No. | Composition | Surface resistance | | P. C. ratio | Return |
|---|---|---|---|---|---|
| 25 | $1PbTiO_3, 4BaTiO_3$ | 14 | 7.4 | 1.89 | No. |
| 26 | $2.5PbTiO_3, 2.5BaTiO_3$ | 13 | 6 | 2.17 | No. |
| 27 | $4PbTiO_3, 1BaTiO_3$ | 5.9 | 3.2 | 1.84 | No. |
| 28 | $1PbTiO_3, 4SrTiO_3$ | 600 | 42 | 14.29 | Yes. |
| 29 | $2.5PbTiO_3, 2.5SrTiO_3$ | 1 | .775 | 1.29 | No. |
| 30 | $4PbTiO_3, 1SrTiO_3$ | 6.4 | 3.2 | 2.0 | No. |

Table III

| Example No. | Composition | Surface resistance | | P. C. ratio | Return |
|---|---|---|---|---|---|
| 31 | $TiO_2$ | 400 | 65 | 6.15 | Yes. |
| 32 | Rutile | 3.1 | 3.05 | 1.02 | No. |

In addition to the compositions listed in the above tables, a number of other compositions were tested which showed no photo-conductivity, that is, the P. C. ratio is 1.

Although the preferred form of the present invention contemplates the use of titanium dioxide fired to the form of ceramic bodies, it is possible also to use the materials in powdered form. Generally, however, this is less satisfactory from the point of view of accuracy, efficiency and durability. Nevertheless, for some uses the powdered materials may be preferred, particularly where ready adaptability and intricate shapes are required. Thus, the materials might be enclosed in a transparent impervious sheath, such as of glass.

In the practice of the present invention, the thicknesses of the finished photoconductive bodies may vary over a wide range. Preferably they should be thick enough to stand the wear and tear of ordinary handling. Apparently the photoconductivity is a surface phenomenon, so that the resistance will vary directly as the distance between electrodes, and inversely as the width of the area between electrodes, the width being taken as the dimension at right angles to the shortest line joining the electrodes. The resistance may also be decreased by increasing the number of electrodes in parallel with each other. By varying these factors, practically any working range of initial resistance desired can be provided. The electrodes may be sprayed metal, or fired-on suspensions of platinum or gold, a familiar practice in the ceramic industry.

The photoconductive composition and method of the present invention can be used for any of the myriads of applications now known for photocells, such as television, telegraphic picture transmission, talking movies, photometry, colorimetry, operation of relays, color matching, color analysis, illumination control, control of smoke, traffic control, counting, raw material inspection, safety devices, automatic weaving, time recording, calibration of meters, communication by modulated light beam, talking lights, mechanical reading, infra red detection, and numerous types of control operations. A suitable cell using titanium dioxide may be similar to that shown in the drawing, except that fired on conductors are used much longer, narrower, closer together, and more numerous than those depicted. In this way a wide range of dark resistances can be obtained. The current passing between electrodes may be further increased by amplification. Such latticed parallel conductor cells may be used in sound movies. A picture transmission system using titanium dioxide may consist of regularly spaced pairs of dot electrodes on a titanium dioxide plate, each dotted pair constituting a unit cell, each being separately connected and amplified for transmission by wire or by radio. The dot electrodes may be replaced by closely separated islands of lattice groups. If a large number of dotted electrodes, or latticed electrodes, separately connected, are used, and suitably arranged around a varying source of light, the need for scanning disks or similar light splitting devices is eliminated. Very large photoconducting surfaces would be used in transmission and reduced in size in reception to eliminate grain, while telegraphic transmission could be accomplished by amplification and reproduced on a screen consisting of a mosaic of minute light bulbs.

When parts or percentages are given, parts and percentages by weight are understood.

As many variations are possible within the scope of this invention, it is not intended to be limited except as defined by the appended claims.

I claim:

1. A method of forming a ceramic material having an electric resistance which varies with the amount of light impinging upon the surface of said material, said material containing titanium dioxide as its principal ingredient, comprising overfiring said ceramic material, and flashing in a reducing atmosphere while overfiring, said overfiring and said flashing being sufficient to impart to said material an electric resistance which varies with the amount of light impinging upon the surface of said material.

2. A ceramic material having an electric resistance which varies with the amount of light impinging upon the surface of said material, said material containing a major amount of titanium dioxide and a minor amount of titanium sesquioxide sufficient to impart to said material a tint ranging from violet to green in the visible spectrum.

3. A ceramic material having an electric resistance which varies with the amount of light impinging upon the surface of said material, said material containing a major amount of titanium dioxide and a minor amount of a lower oxide of a metal taken from the group consisting of iron, manganese, chromium and vanadium.

4. A ceramic material having an electric resistance which varies with the amount of light impinging upon the surface of said material, said material containing a major amount of titanium dioxide, a minor amount of a lower oxide of a metal taken from the group consisting of iron, manganese, chromium and vanadium, and a minor amount of an oxide which will stabilize and maintain said lower oxide in the lower valent state.

5. A ceramic material having an electric resistance which varies with the amount of light impinging upon the surface of said material, said material containing a major amount of titanium dioxide, a minor amount of a lower oxide of a metal taken from the group consisting of iron, manganese, chromium and vanadium, and a minor amount of a divalent oxide taken from the group consisting of calcium, strontium, barium, magnesium, beryllium, copper, zinc, cadium, lead, cobalt and nickel.

6. A ceramic material having an electric resistance which varies with the amount of light impinging upon the surface of said material, said material being overfired and containing a major amount of titanium dioxide, said overfiring being sufficient to impart to said material an electric resistance which varies with the amount of light impinging upon the surface of said material.

7. A ceramic material having an electric resistance which varies with the amount of light impinging upon the surface of said material, said material being overfired and containing a major amount of titanium dioxide and a minor amount of a substance which will impart a tint ranging from violet to green in the visible spectrum, said overfiring being sufficient to impart to said material an electric resistance which varies with the amount of light impinging upon the surface of said material.

8. A ceramic material having an electric resistance which varies with the amount of light impinging upon the surface of said material, said material being overfired and containing a major amount of titanium dioxide and a minor amount of titanium sesquioxide sufficient to impart to said material a tint ranging from violet to green in the visible spectrum.

9. A ceramic material having an electric resistance which varies with the amount of light impinging upon the surface of said material, said material being overfired and containing a major amount of titanium dioxide and a minor amount of a lower oxide of a metal taken from the group consisting of iron, manganese, chromium and vanadium.

10. A ceramic material having an electric resistance which varies with the amount of light impinging upon the surface of said material, said material being overfired and containing a major amount of titanium dioxide, a minor amount of a lower oxide of a metal taken from the group consisting of iron, manganese, chromium and vanadium, and a minor amount of an oxide which will stabilize and maintain said lower oxide in the lower valent state.

11. A ceramic material having an electric resistance which varies with the amount of light impinging upon the surface of said material, said material being overfired and containing a major amount of titanium dioxide, a minor amount of a lower oxide of a metal taken from the group consisting of iron, manganese, chromium and vanadium, and a minor amount of a divalent oxide taken from the group consisting of calcium, strontium, barium, magnesium, beryllium, copper, zinc, cadmium, lead, cobalt and nickel.

EUGENE WAINER.